United States Patent [19]

Minoura et al.

[11] Patent Number: 4,585,296
[45] Date of Patent: Apr. 29, 1986

[54] SCANNING OPTICAL SYSTEM HAVING A TILTING CORRECTING FUNCTION

[75] Inventors: Kazuo Minoura; Kazuhiko Matsuoka, both of Yokohama, Japan

[73] Assignee: Canon Kabushiki Kaisha, Tokyo, Japan

[21] Appl. No.: 601,548

[22] Filed: Apr. 18, 1984

Related U.S. Application Data

[63] Continuation of Ser. No. 351,533, Feb. 23, 1982, abandoned.

[30] Foreign Application Priority Data

Mar. 3, 1981 [JP] Japan ................................. 56-30347
Mar. 3, 1981 [JP] Japan ................................. 56-30353

[51] Int. Cl.⁴ ........................ G02B 27/17; G02B 3/06
[52] U.S. Cl. ..................................... 350/6.5; 350/6.8; 350/434
[58] Field of Search ............... 350/6.8, 6.7, 6.6, 6.5, 350/6.1, 6.9, 6.91, 434, 432

[56] References Cited

U.S. PATENT DOCUMENTS

| | | | |
|---|---|---|---|
| 3,750,189 | 1/1973 | Fleischer | 350/6.91 |
| 3,787,107 | 1/1974 | Sick et al. | 350/6.8 |
| 3,865,465 | 2/1975 | Tatuoka et al. | 350/6.8 |
| 3,870,394 | 3/1975 | Ploeckl | 350/434 |
| 3,890,034 | 6/1975 | Ploeckl | 350/6.8 |
| 3,984,171 | 10/1976 | Hotchkiss | 350/6.7 |
| 3,995,110 | 11/1976 | Starkweather | 350/6.8 |
| 4,073,566 | 2/1978 | Noguchi | 350/6.8 |
| 4,123,135 | 10/1978 | Rabedeau | 350/6.8 |
| 4,281,889 | 8/1981 | Noguchi | 350/6.8 |
| 4,379,612 | 4/1983 | Matsuoka et al. | 350/6.8 |

OTHER PUBLICATIONS

J. M. Fleischer et al, *IBM Jour. of R. & D.*, vol. 21, No. 5, Sep. 1977, pp. 479-483.

*Primary Examiner*—Jon W. Henry
*Attorney, Agent, or Firm*—Fitzpatrick, Cella, Harper & Scinto

[57] ABSTRACT

A compact scanning optical system includes a scanning light beam generator, a detector for deflecting the light beam from the generator in a predetermined direction, a first optical system for forming the light beam from the generator linearly near the deflecting and reflecting surface of the deflector, and a single optical element disposed and having a power between the deflector and a surface to be scanned. The single optical element has a power both in the deflection plane of the light beam deflected by the deflector and a plane orthogonal to the deflection plane and has different powers in the orthogonal planes.

10 Claims, 16 Drawing Figures

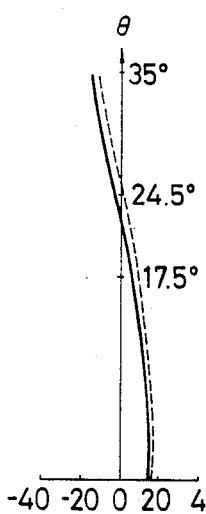
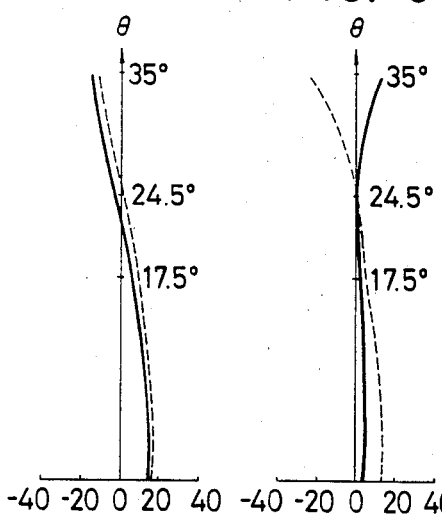
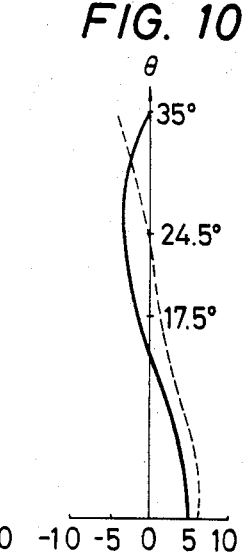
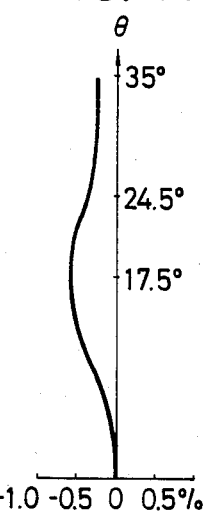
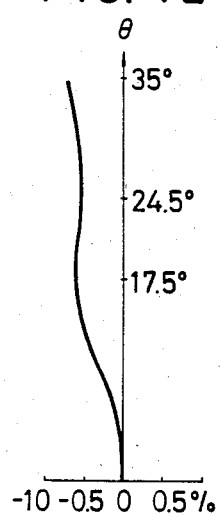
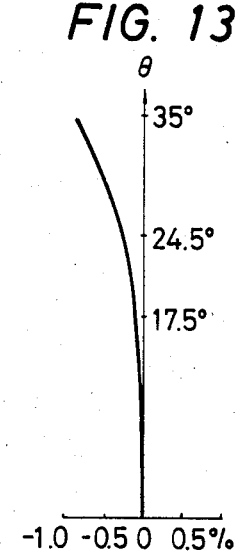

SCANNING OPTICAL SYSTEM HAVING A TILTING CORRECTING FUNCTION

This is a continuation of application Ser. No. 351,533, filed Feb. 23, 1982 and now abandoned.

BACKGROUND OF THE INVENTION

1. Field of the Invention

This invention relates to a scanning optical system which eliminates pitch unevenness of scanning lines.

2. Description of the Prior Art

In the art of light beam scanning devices using a deflecting and reflecting surface such as a rotating polygonal mirror, various scanning optical systems have been proposed in which no unevenness is created in the pitch of scanning lines on a surface to be scanned (a medium to be scanned) even if the direction of travel of a light beam deflected and scanned is varied in a plane perpendicular to the deflection plane by the tilting of the deflecting and reflecting surface of the mirror. The term "deflection plane" used herein refers to a light beam plane which is formed with lapse of time by a light beam deflected by the deflecting and reflecting surface of the deflector.

For example, in U.S. Pat. No. 3,750,189, the optical system between a deflector and a medium to be scanned comprises beam reforming means and second converging means. A light beam reflected by a deflecting mirror is collimated by the beam reforming means. However, when the optical system has the collimating function, limitations are imposed on the configuration of the beam reforming means, and the imaging performance on the surface to be scanned and the degree of freedom which will better the strain characteristic for making the scanning speed constant will be decreased. Unless the number of lenses forming the second converging means is increased, good performance cannot be obtained.

In U.S. Pat. No. 3,865,465, a predetermined limitation is imposed on the ratio of the focal lengths of two lenses forming the optical system between the deflector and the medium to be scanned and satisfying this limitation is equivalent to collimating the light beam in a cross section perpendicular to the deflection plane between the two lenses. Accordingly, again in this example, the image performance and the degree of freedom which well corrects the strain characteristic are decreased and this is not desirable.

In U.S. Pat. No. 3,946,150, a cylindrical lens is disposed between a lens having a strain characteristic for realizing uniform speed scanning and the medium to be scanned. In the case of such construction, a good image cannot be obtained unless the position of the cylindrical lens is brought close to the medium to be scanned. If the cylindrical lens is brought close to the medium to be scanned, it will become longer in the direction of the bus line as the scanning width becomes greater, and this will prevent the construction from being made in compact form.

Further, in an optical system using a cylindrical lens or a toric lens in which, as disclosed in the aforementioned U.S. Pat. No. 3,750,189, the refractive power of the optical system differs in a direction in which the beam is deflected by the deflector and in a direction orthogonal to that direction, if a machining error or error in assembling the lenses exists, then a difference in the imaging point between the two orthogonal directions will result. This is the so-called astigmatic difference and, when such astigmatic difference is produced, the optimal imaging point cannot be obtained even if the position of the medium to be scanned is adjusted.

SUMMARY OF THE INVENTION

It is an object of the present invention to overcome the above-noted disadvantages characteristic of prior art scanning devices and to provide a scanning optical system which is of simple and compact construction and capable of correcting for the tilting of the deflector.

It is a further object of the present invention to provide a scanning optical system beam scanning speed of which is constant on a surface to be scanned.

It is still a further object of the present invention to provide a scanning optical system which, when an astigmatic difference is produced in the imaging points in two orthogonal directions, corrects the astigmatic difference by simple adjusting means and causes an optimal imaged spot to be formed on the medium to be scanned.

In the scanning optical system according to the present invention, the above objects are achieved by forming the imaging optical system for scanning disposed between the deflector and the medium to be scanned as a single lens having a toric surface. That is, the scanning optical system according to the present invention is provided with a light source device, a first imaging optical system for linearly imaging the light beam from the light source device, a deflector having its deflecting and reflecting surface near the linear image, and a second imaging optical system for forming the linear image as a spot on a medium to be scanned, the second imaging optical system being comprised of a single toric lens. The term "toric lens" used herein means a lens which, in a plane orthogonal to the optical axis of the lens, has a power in orthogonal directions and in which the power differs between the orthogonal directions.

In the scanning optical system according to the present invention, the toric lens is a positive meniscus lens which, in a cross section containing the optical axis and perpendicular to the deflection plane formed by the beam deflected by the deflector, comprises a surface having a negative refractive power on the deflector side and a surface having a positive refractive power on the side of the medium to be scanned. That is, the toric lens is of a meniscus shape having its concave surface facing the deflector in a plane perpendicular to the deflection plane.

In the scanning optical system according to the present invention, the imaging optical system for scanning disposed between the deflector and the medium to be scanned does not have beam reforming means for collimating the light beam deflected by the deflector. That is, it does not use means having a collimating function and therefore, no limitation is imposed on the imaging performance of the imaging optical system or the degree of freedom with which the strain characteristic can be well corrected. This results in realization of a simple and compact construction.

The device according to the present invention can be made compact as compared with the case where a cylindrical lens is disposed between the deflection plane and the medium to be scanned as has heretofore been done. That is, where a cylindrical lens is employed, the refractive power thereof in the deflection plane is zero and has no degree of freedom which corrects the curvature of image field. In contrast, a toric lens has a refractive power in the deflection plane and can therefore correct the curvature of image field. If an attempt is made to make the imaging optical system for scanning compact by using a cylindrical lens, a great deal of curvature of image field will be created and it cannot be corrected by the cylindrical lens itself for the reason set forth above. In contrast, a toric lens has a degree of freedom of correction and accordingly can make the device compact.

Further, in the scanning optical system according to the present invention, the first imaging optical system is movable in the direction of the optical axis. The astigmatic difference of the beam spot in two planes orthogonal to each other is corrected by this movement.

The invention will become more fully apparent from the following detailed description thereof taken in conjunction with the accompanying drawings.

BRIEF DESCRIPTION OF THE DRAWINGS

FIGS. 8, 9 and 10 show the curvature of image field in the embodiments of the scanning optical system according to the present invention.

FIGS. 11, 12 and 13 illustrate the strain with respect to uniformity of speed of the embodiments of the scanning optical system according to the present invention.

DESCRIPTION OF THE PREFERRED EMBODIMENTS

Figure 1:
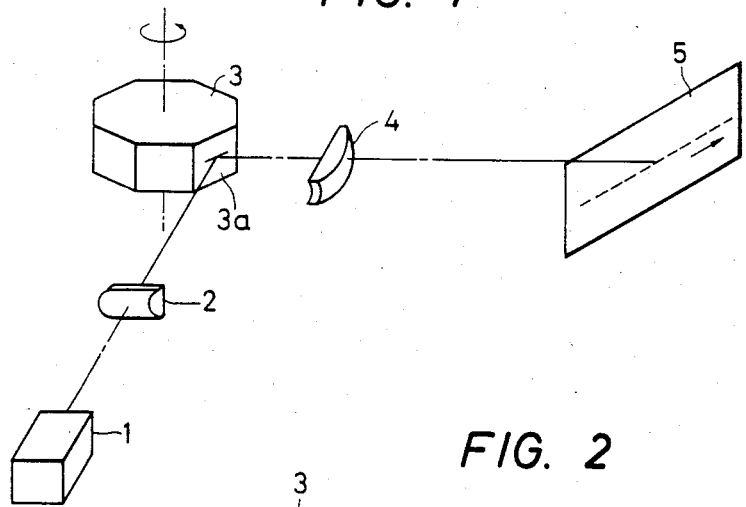
FIG. 1 is a perspective view of an embodiment of the scanning optical system according to the present invention.
Figure 4:
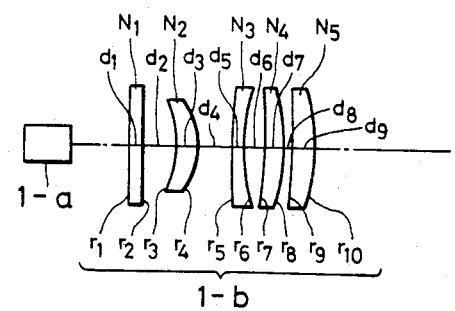
FIG. 4 shows an embodiment of the light source portion of the scanning optical system according to the present invention.

FIG. 1 illustrates a preferred embodiment of the construction according to the principle of the present invention. This embodiment comprises a light source device 1 comprising either a light source above or a light source 1-a and a condensing device 1-b as shown in FIG. 4, a linear image forming system 2 for linearly imaging a light beam emitted from the light source device 1, a deflector 3 having a deflecting and reflecting surface 3a near a position where the light beam is linearly converged by the linear image forming system 2, and a single lens 4 between the deflector 3 and a medium 5 to be scanned. The single lens 4 has different refractive powers in two orthogonal directions and has a toric surface having a main axis and an auxiliary axis. An imaged spot is formed on the medium 5 to be scanned and, as the deflector 3 is rotated, the imaged spot scans the medium 5.

Figure 2:
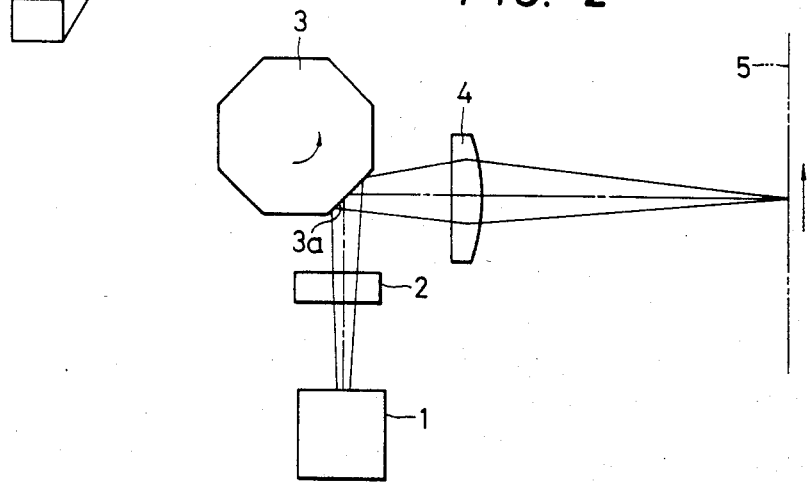
FIG. 2 is a plan view of the scanning optical system shown in FIG. 1.

FIG. 2 is a view for illustrating the function of the invention which is a cross section parallel to the deflection plane of the above-described construction, or in other words, to a plane containing the main axis and the optical axis of the toric lens 4. The light beam emitted from the light source device 1 passes through the cylindrical lens 2, after which it is reflected by the reflecting surface 3a of the deflector 3 and the reflected light beam is deflected as the deflector 3 is rotated. Further, the deflected light beam is imaged on the medium 5 to be scanned by the lens 4 having a toric surface and the scanning speed of the imaged spot is kept constant.

Figure 3:
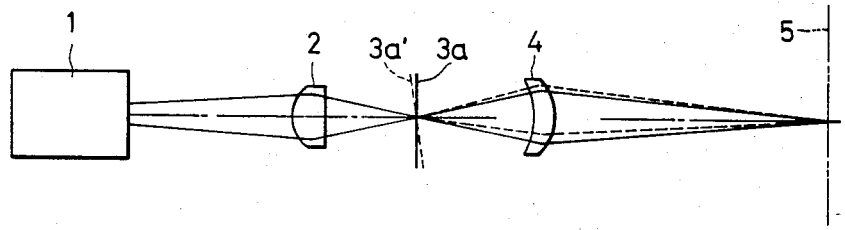
FIG. 3 is a view illustrating the function of the present invention taken in a cross section perpendicular to the deflection plane.

FIG. 3 is a developed view of a cross section along the light beam in a direction perpendicular to the deflection plane, namely, a cross section for correcting the influence of the tilting of the deflector. The light beam emitted from the light source device 1 is linearly imaged near the reflecting surface 3a of the deflector 3 by the linear image forming system 2. The refractive power of the single lens 4 in this cross section, unlike the refractive power of the lens 4 in said deflection plane, makes the positional relation between the reflecting surface 3a of the deflector 3 and the medium 5 to be scanned optically conjugate. Because of such a relation, even if the reflecting surface 3a is inclined in a direction perpendicular to the deflection plane to assume a position 3a' during rotation of the deflector 3, the light beam passed through the lens 4 varies as indicated by broken lines but the imaged position on the medium 5 to be scanned does not vary.

An explanation will now be given of why good imaging performance and uniform speed scanning on the medium are achieved in the scanning optical system of the present invention in spite of its being of simple and compact construction. Where the aperture ratio is as small as 1:50–1:150, good scanning properties can be obtained.

Since a toric surface is introduced with respect to a direction perpendicular to the deflection plane, it is possible to provide a focal length different from the focal length in the deflection plane. Accordingly, it is possible to provide an imaging relation different from the imaging relation in the deflection plane, and the position of the reflecting surface 3a of the deflector and the medium 5 to be scanned are brought into a conjugate relation.

What is more important in the present invention is that at least one surface of the single lens 4 having a toric surface has a negative refractive power in the cross section perpendicular to the deflection plane. This is convenient for correcting the curvature of image field for causing the light beam deflected in the cross section perpendicular to the deflection plane to form a good imaged spot on the medium 5 to be scanned. This means that the diverging power for the incident light beam in the cross section perpendicular to the deflection plane becomes stronger as the deflection angle becomes greater and it results in the effect of correcting the image plane in the positive direction.

Another important point is that in the cross section perpendicular to the deflection plane, the shape of the single lens 4 having the toric surface should desirably be that of a single meniscus lens the surface of which having a positive refractive power being disposed on the side of the medium 5 to be scanned and which has a positive refractive power as a whole. This leads to the effect of bringing the principal point position of the single lens 4 having the toric surface in the cross section perpendicular to the deflection plane close to the medium to be scanned and as a result, it becomes possible to bring the entire lens system close to the deflector and make the lens system compact.

On the other hand, the desired value of a distortion coefficient V to be corrected is determined by the rotational characteristic of the deflector 3.

When the deflector 3 is rotated at a uniform angular speed, the value of the distortion coefficient for which the light beam deflected by the deflector is moved on the medium 5 to be scanned at a uniform speed is $V = \frac{2}{3}$.

Where the deflector 3 rotates in accordance with a sine function as represented by $\phi = \phi_0 \sin \omega t$ ($\phi$ is the angle of rotation, $\phi_0$ is the amplitude, $\omega$ is a constant regarding the period, and t is time), the value of the distortion coefficient for which the light beam deflected by the deflector 3 is moved on the medium 5 to be scanned at a uniform speed is $$V = \frac{2}{3}\left(1 - \frac{1}{8\phi_0^2}\right).$$

An embodiment of the present invention will now be described in detail.

Table 1 set forth below shows the construction of a collimater lens 1-b (FIG. 4) for collimating the divergent light beam from the light source 1-a. ri (i=1-10) represents the radius of curvature, di (1-9) represents the inter-surface spacing or the thickness of the lenses, and Ni (i=1-5) represents the refractive index of the glass material which to make each component.

This construction is shown in FIG. 4. The distance between the light-emitting point of the light source and the surface $r_1$ is 2.59.

Figure 5:
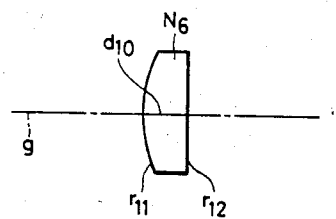
FIG. 5 shows an embodiment of the first imaging optical system of the scanning optical system according to the present invention.

Table 2 set forth below shows the construction in a case where the linear image forming system 2 is a cylindrical lens as shown in FIG. 5. The bus line thereof is disposed parallel to the deflection plane. $r_{11}$ and $r_{12}$ represent the radii of curvature, in succession from the light source device side, in a cross section containing the optical axis g and perpendicular to the deflection plane, $d_{10}$ represents the on-axis thickness thereof, and $N_6$ represents the refractive index of the glass material thereof.

FIG. 5 is a view in the cross section containing the optical axis g and perpendicular to the deflection plane.

Figure 6:
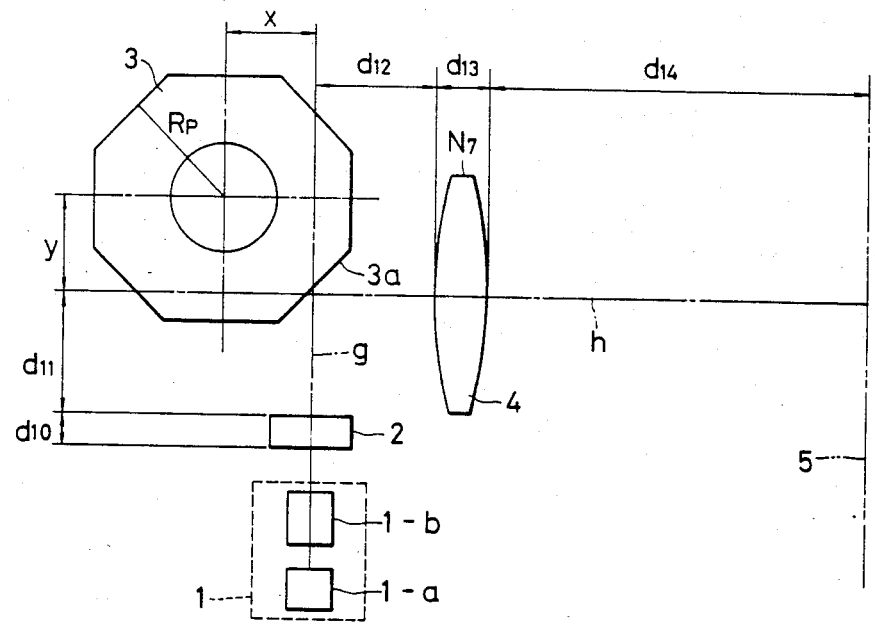
FIGS. 6 and 7 show embodiments of the scanning optical system according to the present invention.

Tables 3-6 set forth below show the construction of the linear image forming system 2 after the surface thereof adjacent to the deflector. As regards the parameters of Tables 3 and 4, as shown in FIG. 6, $d_{11}$ represents the distance between the surface of the linear image forming system 2 which is adjacent to the deflector and the optical axis of the toric lens 4, $d_{12}$ represents the distance between the optical axis g and the surface of the toric lens 4 which is adjacent to the deflector, $d_{13}$ represents the on-axis thickness of the toric lens 4, and $d_{14}$ represents the spacing between the toric lens 4 and the medium 5 to be scanned. $\widetilde{r}_{13}$ and $\widetilde{r}_{14}$ represent the radii of curvature of the toric lens in a plane containing the optical axis h and parallel to the deflection plane, and $r_{13}$ and $r_{14}$ represent the radii of curvature in a cross section containing the optical axis h and perpendicular to the deflection plane. $N_7$ represents the refractive index of the material of the toric lens.

Tables 3 and 4 show the construction of embodiments in a case where the deflector is a rotating polygonal mirror which effects uniform angular speed rotation.

The radius Rp of the inscribed circle of the polygonal mirror is Rp=28.85 mm, and the position of the center of rotation thereof lies at X=21 mm from the optical axis g and at Y=21 mm from the optical axis h.

In the embodiments of Tables 3 and 4, the toric lens 4 has, in the cross section containing the optical axis h and perpendicular to the deflection plane, a concave surface in which the surface adjacent to the deflector has a negative refractive power. When the deflection angle of the beam has increased with rotation of the deflector, it displays the effect of correcting the corresponding curvature of image field in a plane perpendicular to the deflection plane. Further, in the plane perpendicular to the deflection plane, there is a meniscus lens having a concave surface adjacent to the deflector and having a positive refractive power. Both of them can well make uniform the speed of the imaged spot on the medium to be scanned.

Figure 7:
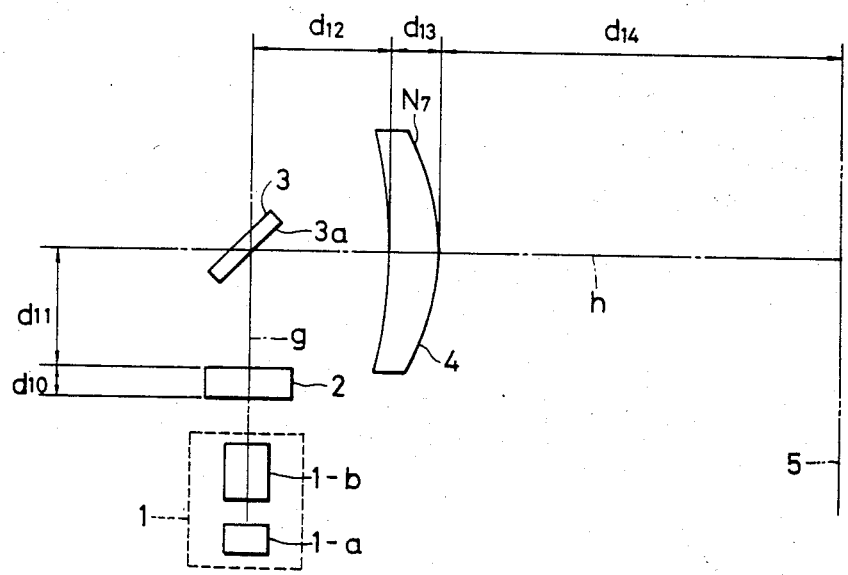

Table 5 set forth below shows the construction of an embodiment in a case where the deflector effects oscillates in accordance with a sine function as shown in FIG. 7, and the center of rotation thereof lies on the point of intersection between the optical axis g and the optical axis h and on the reflecting surface.

Again in these cases, as in the embodiments of Tables 3 and 4, the toric lens 4 has, in the cross section containing the optical axis h and perpendicular to the deflection plane, a concave surface in which the surface adjacent to the deflector has a negative refractive power, and displays the effect of correcting the curvature of image field. These embodiments can also make uniform the speed of movement of the imaged spot on the medium to be scanned.

FIGS. 8-10 show the curvature of image field in the embodiments corresponding to Tables 3-5, respectively. The solid line indicates the curvature of image field in the deflection plane, and the broken line indicates the curvature of image field in a plane perpendicular to the deflection plane. $\theta$ is the deflection angle (angle of view).

FIGS. 11-13 show the strain with respect to the uniformity of speed in the embodiments corresponding to Tables 3-5, respectively. The strain is defined by the following formula.

$$\text{Strain} = \frac{y'(\theta) - y'_0(\theta)}{y'_0(\theta)} \times 100(\%)$$

Where $y'(\theta)$ represents the distance from the optical axis h on the medium 5 to be scanned to the imaged spot position for the deflection angle $\theta$, and $y'_0(\theta)$ represents the ideal distance from the optical axis h to the imaged spot position for making uniform the speed of movement of the imaged spot on the medium to be scanned for the deflection angle $\theta$. FIGS. 11 and 12 show the strain when $Y'_0 = K \cdot \theta$, and FIG. 11 shows the strain when K=242.00, and FIG. 12 shows the strain when K=242.47. FIG. 13 shows the strain when $$y'_0 = 2\phi_0 K \cdot \text{Sin}^{-1}\left(\frac{\theta}{2\phi_0}\right),$$

where $\phi_0$ represents the amplitude of the sine function movement of the deflector, and FIG. 13 represents the strain when $\phi_0 = 0.49742$ rad and K=247.82.

FIGS. 8–10 show the curvature of image field with the medium 5 to be scanned shown in FIG. 6 or 7 as the reference position and any of these embodiments creates the effect of correcting the curvature of image field by establishing $$|r_{13}| < |\tilde{r}_{13}|$$

$$|r_{14}| < |\tilde{r}_{14}|.$$

The embodiments of FIGS. 8 and 9 can suppress the curvature of image field within the depth of focus by selecting the effective aperture ratio of the light beam imaged on the medium to be scanned to the order of 1:140, and can produce a uniform imaged spot diameter. FIGS. 11–12 show the strain in each embodiment, and both of these embodiments can form a good image on the medium to be scanned with a strain within 1%.

In the embodiment of Table 3, the surface of the toric lens which is adjacent to the deflector is cylindrical in cross sections parallel to the deflection plane and such cylindrical surface can be easily machined by grinding even if the lens is made of glass.

The embodiments of Table 4 or 5 have bi-toric surfaces, and by choosing a plastic such as acryl as the material for these lenses, it is easy to form these lenses by compression, injection or molding such as casting.

The foregoing embodiments have been described with respect to a case where the beam emitted from the light source device 1 is a parallel light beam, but even if the beam is a divergent light beam or a convergent light beam, the invention can be easily realized in accordance with the present embodiment.

It is also possible to use a semiconductor laser or a light-emitting diode as the light source. Alternatively, a beam reforming optical system may be disposed between the light source device and the deflector so that a desired aperture ratio of imaged light beam may be obtained by using as the light source device a laser such as He-Ne laser which emits a parallel beam. The unit of the length appearing in the present invention is mm.

TABLE 1

| | | | | | |
|---|---|---|---|---|---|
| $r_1$ | ∞ | $d_1$ | 1.3 | $N_1$ | 1.60907 |
| $r_2$ | ∞ | $d_2$ | 1.4 | | |
| $r_3$ | −38.368 | $d_3$ | 1.31 | $N_2$ | 1.79320 |
| $r_4$ | −6.813 | $d_4$ | 8.7 | | |
| $r_5$ | 333.6 | $d_5$ | 0.8 | $N_3$ | 1.61571 |
| $r_6$ | 32.603 | $d_6$ | 0.62 | | |
| $r_7$ | −41.786 | $d_7$ | 1.29 | $N_4$ | 1.79320 |
| $r_8$ | −16.141 | $d_8$ | 0.11 | | |
| $r_9$ | −71.932 | $d_9$ | 1.63 | $N_5$ | 1.79320 |
| $r_{10}$ | −23.352 | | | | |

TABLE 2

| | | | | | |
|---|---|---|---|---|---|
| $r_{11}$ | 30.789 | $d_{10}$ | 7. | $N_6$ | 1.71037 |
| $r_{12}$ | ∞ | | | | |

TABLE 3

| | | | | | | | |
|---|---|---|---|---|---|---|---|
| | | | | $d_{11}$ | 37.33 | | |
| | | | | $d_{12}$ | 74.392 | | |
| $\tilde{r}_{13}$ | ∞ | $r_{13}$ | −138.5302 | $d_{13}$ | 14. | $N_7$ | 1.63398 |
| $\tilde{r}_{14}$ | −158.4066 | $r_{14}$ | −32.1568 | $d_{14}$ | 234.82 | | |

TABLE 4

| | | | | | | | |
|---|---|---|---|---|---|---|---|
| | | | | $d_{11}$ | 38.33 | | |
| | | | | $d_{12}$ | 74.365 | | |
| $\tilde{r}_{13}$ | 1197.108 | $r_{13}$ | −108.3506 | $d_{13}$ | 14. | $N_7$ | 1.4833 |

TABLE 4-continued

| | | | | | | | |
|---|---|---|---|---|---|---|---|
| $\tilde{r}_{14}$ | −133.795 | $r_{14}$ | −24.8356 | $d_{14}$ | 234.82 | | |

TABLE 5

| | | | | | | | |
|---|---|---|---|---|---|---|---|
| | | | | $d_{11}$ | 39.33 | | |
| | | | | $d_{12}$ | 45.27 | | |
| $\tilde{r}_{13}$ | −163.63 | $r_{13}$ | −51.47 | $d_{13}$ | 14.00 | $N_7$ | 1.4833 |
| $\tilde{r}_{14}$ | −71.44 | $r_{14}$ | −17.169 | $d_{14}$ | 253.81 | | |

Description will now be made of a technique for independently adjusting, in the above-described optical system, the position of the imaging point in the cross section parallel to the deflection plane and the position of the imaging point in the cross section perpendicular to the deflection plane.

In FIG. 2, in the cross section parallel to the deflection plane, it is possible to adjust the degree of divergence or the degree of convergence of the light beam emitted from the light source device 1 to thereby move the imaging point position after having passed through a second imaging optical system disposed between the deflector 3 and the photosensitive medium 5 and thus, it is possible to realize optimal imaging on the photosensitive medium 5. This is accomplished by adjusting the spacing between the light source 1-a and the collimator lens 1-b shown in FIG. 4.

On the other hand, in FIG. 3, it is possible to move the first imaging optical system 2 in a direction parallel to the optical axis to thereby move the linear image position relative to the deflecting and reflecting surface 3a and move the imaging position conjugate with that linear image position. Accordingly, it is possible to realize optimal imaging on the photosensitive medium 5.

The above-described adjusting method generally displays its effect in the following two cases.

First is a case where the divergence origin position of the light source differs in two orthogonal directions. Unless the above-described adjustment is effected, the imaging positions in two directions orthogonal to each other on the photosensitive medium will differ from each other and it will be impossible to obtain an appropriate spot shape. If the above-described adjusting method is adopted, for example, where the photosensitive medium 5 is disposed at the optimal imaging position in the deflection plane, the position of the first imaging optical system 2 can be moved in the direction of the optical axis to thereby enable the optimal imaging position in the direction perpendicular to the deflection plane to coincide with the photosensitive medium.

In a second case, the imaging positions differ from each other in two directions orthogonal to each other on the photosensitive medium when there is an error in the surface accuracy or the thickness or the arrangement of the lens system. Again in such a case, if the above-described adjusting method is adopted, for example, where the photosensitive medium 5 is disposed at the optimal imaging position in the deflection plane, it is possible to move the position of the first imaging optical system 2 in the direction of the optical axis to thereby enable the optimal imaging position in the direction perpendicular to the deflection plane to coincide with the photosensitive medium.

Description will now be made specifically of methods of moving the first imaging optical system in the direction of the optical axis and the means therefor.

First is a method in which the first imaging optical system is placed on a movable stage.

Second is a method of inserting washers relative to a reference surface.

Figure 14:
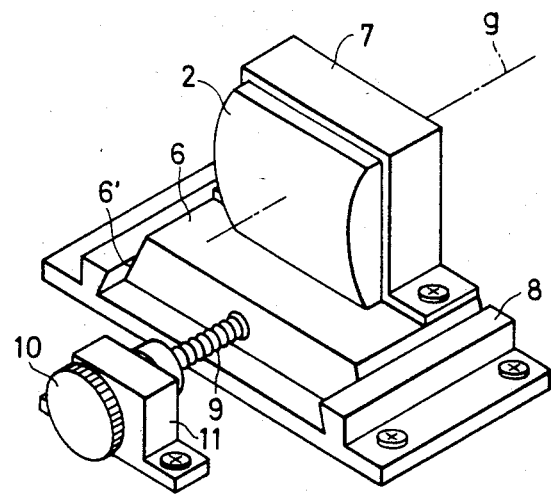
FIGS. 14 and 15 illustrate the construction for adjusting the scanning optical system according to the present invention.

An embodiment of the method in which the first imaging optical system on a movable stage is shown in FIG. 14. In the figure, the first imaging optical system is placed is fixed on a movable stage 6 by a holder 7.

The left and right ends of the movable stage 6 and a fixing plate 8 are fitted together by a dovetail groove structure 6'. A feed screw 9 having a rotational knob 10 at one end thereof is threadably coupled to the movable stage 6. The rotational knob 10 is rotatably held relative to a screw receiver 11 and therefore, by turning the rotational knob 10 either lefthandedly or righthandedly, the movable stage 6 can be fed back and forth in the direction of the optical axis g. Accordingly, the first imaging optical system 2 can be accurately moved without meandering relative to the direction of the optical axis g.

Figure 15:
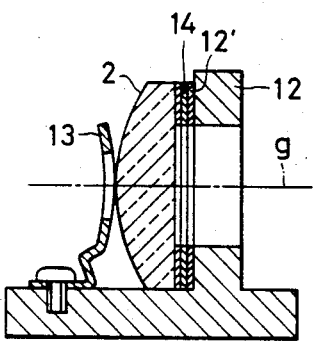

FIG. 15 is a cross sectional view illustrating an embodiment of the method of inserting washers relative to the reference surface.

In FIG. 15, the first imaging optical system 2 is placed on an optical holding bed 12. The reference surface 12' of the optical holding bed 12 and the front surface of the first imaging optical system 2 are disposed with a plurality of washers 14 interposed therebetween. The first imaging optical system 2 is pressed from the back thereof by a leaf spring 13 fixed to the optical holding bed 12. Accordingly, either by withdrawing the washers 14 or by inserting additional washers, the first imaging optical system 2 can be moved back and forth in the direction of the optical axis g.

This method suffers from the disadvantage that the minimum unit of the amount of movement of the first imaging optical system is determined by the thickness of the washers. However, as compared with the aforementioned method using a movable stage, this method can move the first imaging optical system in the direction of the optical axis with a very simple mechanism.

Figure 16:
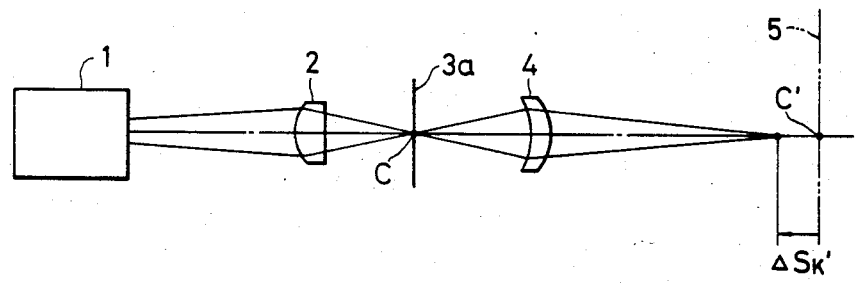
FIG. 16 illustrates the amount of adjustment of the scanning optical system according to the present invention.

In the optical system as shown in FIG. 6 or 7, where the position of the medium to be scanned is coincident with the optimal imaging position in the cross section parallel to the deflection plane, or where the surface accuracy of the toric lens 4 is degraded by a machining error, or where an error is created in the position in the direction of the optical axis of the same lens during assembly, it is assumed that the optimal imaging point in the cross section perpendicular to the deflection plane will become spaced from the position of the medium to be scanned by $\Delta Sk'$. Such state is shown in FIG. 16. If, in an ideal system free of any error in the cross section perpendicular to the deflection plane, the linear image C near the surface of the deflecting mirror is formed at a magnification $\beta$ at the imaging point C' on the medium 5 to be scanned, the position of the linear image forming system 2 may be moved by about $-\Delta Sk'/\beta^2$ in order to correct the deviation $\Delta Sk'$ as shown in FIG. 16 and form a conjugate image on the medium to be scanned.

In the previously described scanning optical system, $\beta < -1$ and the amount of movement of the linear image forming system 2 may be less than $|-\Delta Sk'|$. As the value of the imaging magnification $|\beta|$ is greater, the amount of movement of the linear image forming system becomes smaller.

For example, if $\Delta Sk' = 10$ mm and $\beta = -5$, the amount of movement of the linear image forming system will be $-\Delta Sk'/\beta^2 = -0.4$ mm.

Thus, in the optical system of the present invention, the effect of focus position correction can be made great by moving the linear image forming system simply and by a small amount.

We claim:

1. A compact scanning optical system for scanning a surface, said system comprising:
   means for supplying a scanning light beam;
   deflecting means having a deflecting and reflecting surface for deflecting the light beam from said supply means in a predetermined direction toward the surface to be scanned;
   first optical means for linearly forming the light beam from said supply means near said deflecting and reflecting surface of said deflecting means; and
   a single toric lens disposed between said deflecting means and the surface to be scanned, said single toric lens having a power both in the deflection plane of the light beam as deflected by said deflecting means and in a plane orthogonal to said deflection plane and having different powers in orthogonal planes, said single toric lens further having a meniscus shape with its concave surface, in a cross section containing the optical axis and perpendicular to the deflection plane, facing said deflecting means, said meniscus shape further comprising a surface having a positive refractive power, the light beam deflected by said deflecting means being imaged by said single toric lens on the surface to be scanned.

2. A scanning optical system according to claim 1, wherein in a cross section containing the optical axis and parallel to the deflection plane, said single toric lens has radii of curvature $\widetilde{r}_{13}$ and $\widetilde{r}_{14}$ in succession from the side of said deflecting means and, in a cross section containing the optical axis and perpendicular to the deflection plane, said single toric lens has radii of curvature $r_{13}$ and $r_{14}$ in succession from the side of said deflecting means, said radii of curvature being in the following relation:

$$|r_{13}| < |\widetilde{r}_{13}|$$

$$|r_{14}| < |\widetilde{r}_{14}|$$

3. A scanning optical system according to claim 1, wherein said single toric lens is formed of plastic.

4. A scanning optical system according to claim 1, wherein in the deflection plane containing the optical axis, said single toric lens has a plano-convex shape having its convex surface facing the surface to be scanned.

5. A scanning optical system according to claim 1, wherein in the deflection plane containing the optical axis, said single toric lens has a double convex shape.

6. A scanning optical system according to claim 1, wherein in the deflection plane containing the optical axis, said single toric lens has a meniscus shape having its convex surface facing the surface to be scanned.

7. A scanning optical system according to claim 1, wherein in the cross section containing the optical axis and perpendicular to the deflection plane, the absolute value of the radius of curvature of that side of said single toric lens which is adjacent to said deflecting means is greater than the absolute value of the radius of curvature of that side of said single toric lens which is adjacent to the surface to be scanned.

8. A scanning optical system according to claim 1, wherein said single toric lens has, in a cross section containing the optical axis and orthogonal to the deflection plane, at least one surface having a negative power.

9. A compact scanning optical system for scanning a surface, said system comprising:
 means for supplying a scanning light beam;
 deflecting means having a deflecting and reflecting surface for deflecting the light beam from said supply means in a predetermined direction toward the surface to be scanned;
 first optical means for linearly forming the light beam from said supply means near said deflecting and reflecting surface of said deflecting means;
 means for moving said first optical means in the direction of the optical axis; and
 second optical means disposed between said deflecting means and a surface to be scanned for condensing onto the surface to be scanned the light beam deflected by said deflecting means, said second optical means consisting of a single toric lens.

10. A compact scanning optical system for scanning a surface, said system comprising:
 a light source portion for supplying a collimated light beam of a single wavelength;
 a deflector for deflecting the light beam from said light source portion in a predetermined direction toward the surface to be scanned;
 a first imaging optical system for linearly forming, from the light beam supplied by said light source portion, a light beam component in a direction perpendicular to the deflection plane of the light beam as deflected by said deflector near said deflecting and reflecting surface of said deflector; and
 a single toric lens disposed between said deflector and the surface to be scanned for condensing onto the deflection plane the light beam deflected by said deflector, said single toric lens being operative to maintain, in a plane perpendicular to said deflection plane, said deflecting and reflecting surface of said deflector and the surface to be scanned in an optically conjugate relation, said single toric lens, in a plane parallel to said deflection plane, further having a value of distortion for causing the light beam deflected by said deflector to move at a uniform speed on the surface to be scanned.

* * * * *